US008260968B2

(12) United States Patent
Xu et al.

(10) Patent No.: US 8,260,968 B2
(45) Date of Patent: Sep. 4, 2012

(54) METHOD AND SYSTEM FOR BOOTING A SOFTWARE PACKAGE ON A NETWORK PROCESSOR

(75) Inventors: Bing Tao Xu, Singapore (SG); Ingo Volkening, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 930 days.

(21) Appl. No.: 11/337,827

(22) Filed: Jan. 23, 2006

(65) Prior Publication Data
US 2007/0174835 A1  Jul. 26, 2007

(51) Int. Cl.
*G06F 15/16* (2006.01)

(52) U.S. Cl. ........ 709/250; 709/220; 709/221; 709/222; 717/176

(58) Field of Classification Search ............... 709/205, 709/223, 251, 222, 229, 217, 220; 370/229, 370/331, 335, 449, 389, 466, 469, 537, 394, 370/474, 235, 250, 395; 718/103; 714/6, 714/4.4; 710/52, 240; 713/1, 2, 25, 320, 713/100; 719/310; 455/525
See application file for complete search history.

(56) References Cited

U.S. PATENT DOCUMENTS

| | | | | |
|---|---|---|---|---|
| 5,404,527 A * | 4/1995 | Irwin et al. | ..................... | 709/222 |
| 5,640,504 A * | 6/1997 | Johnson, Jr. | ..................... | 714/4.4 |
| 6,122,253 A * | 9/2000 | Jones | ............................. | 370/235 |
| 6,170,008 B1* | 1/2001 | Bahlmann et al. | ............ | 709/220 |
| 6,282,642 B1* | 8/2001 | Cromer et al. | ..................... | 713/2 |
| 6,314,520 B1* | 11/2001 | Schell et al. | ..................... | 726/13 |
| 6,335,933 B1* | 1/2002 | Mallory | ......................... | 370/394 |
| 6,438,128 B1* | 8/2002 | Kashyap | ........................ | 370/389 |
| 6,744,783 B1* | 6/2004 | Tzeng | ............................. | 370/469 |
| 6,826,713 B1* | 11/2004 | Beesley et al. | .................. | 714/25 |
| 6,898,179 B1* | 5/2005 | Bass et al. | ..................... | 370/229 |
| 6,938,235 B2* | 8/2005 | Breejen et al. | .................. | 716/15 |
| 7,028,176 B2* | 4/2006 | Aspegren et al. | ................. | 713/1 |
| 7,330,654 B2* | 2/2008 | Song et al. | ..................... | 398/71 |

(Continued)

OTHER PUBLICATIONS

Persson et al. Reconfigurable Ubiquitous Networked Embedded Systems. Jan. 2006. Information Society Technologies.*
Intel IXP42X Product Line of Network Processors and IXC1100 Control Plane Processor: Boot-Up Options. Tech. Intel, 2004.*
Intel IXP42X Product Line of Network Processors and IXC1100 Control Plane Processor: Developer's Manual. Intel, 2005.*

(Continued)

*Primary Examiner* — Glenton B Burgess
*Assistant Examiner* — Michael Martinez
(74) *Attorney, Agent, or Firm* — Slater & Matsil, L.L.P.

(57) ABSTRACT

A network processor system includes a network processor 1, which is provided with a number of interfaces 9, 11, 13, 15, 19, including one or more Ethernet interfaces 9, 11 and a UART interface 19, which can be used to load a software package into the network processor 1. The software package can thus be modified when required, or when the software package previously stored in the network processor system is corrupted. The Ethernet data packets received on the Ethernet interfaces 9, 11 are in a special format, which the network processor 1 can recognize, to distinguish them from conventional Ethernet packets. Thus, the network processor 1 does not have to be programmed to handle the full range conventional Ethernet data packets. The network processor 1 is provided with a second external non-volatile data storage device 7 in the form of a EEPROM memory 7. The EEPROM memory 7 provides a writable extension of the internal ROM memory of the network processor. It can, for example, be used to store the parameters of other components of a network processor system (e.g. a flash memory 5) so that the network processor 1 can be used in conjunction with components of a wide range of types.

38 Claims, 4 Drawing Sheets

U.S. PATENT DOCUMENTS

| | | | |
|---|---|---|---|
| 7,353,377 B2* | 4/2008 | Ong et al. | 713/2 |
| 2002/0144038 A1* | 10/2002 | Smith | 710/240 |
| 2002/0188837 A1* | 12/2002 | Dayan et al. | 713/2 |
| 2003/0115345 A1* | 6/2003 | Chien et al. | 709/229 |
| 2003/0120912 A1* | 6/2003 | Sasaki et al. | 713/2 |
| 2003/0174729 A1* | 9/2003 | Heink et al. | 370/466 |
| 2003/0185208 A1* | 10/2003 | Lee et al. | 370/389 |
| 2003/0200429 A1* | 10/2003 | Aspegren et al. | 713/2 |
| 2004/0030816 A1* | 2/2004 | Knight et al. | 710/52 |
| 2004/0103177 A1* | 5/2004 | Ismail et al. | 709/222 |
| 2004/0109443 A1* | 6/2004 | Gai et al. | 370/389 |
| 2004/0133771 A1* | 7/2004 | King et al. | 713/100 |
| 2004/0151200 A1* | 8/2004 | Robertson | 370/449 |
| 2004/0158752 A1* | 8/2004 | Borza et al. | 713/320 |
| 2004/0244008 A1* | 12/2004 | Lee | 719/310 |
| 2004/0255111 A1* | 12/2004 | Lim | 713/2 |
| 2005/0054370 A1* | 3/2005 | Shpak | 455/525 |
| 2005/0235045 A1* | 10/2005 | Narayanaswami et al. | 709/217 |
| 2005/0276283 A1* | 12/2005 | Gyselings et al. | 370/537 |
| 2005/0289551 A1* | 12/2005 | Wojtkiewicz et al. | 718/103 |
| 2006/0045079 A1* | 3/2006 | Bahls et al. | 370/389 |
| 2007/0061417 A1* | 3/2007 | Berg | 709/217 |
| 2007/0088974 A1* | 4/2007 | Chandwani et al. | 714/6 |
| 2007/0223386 A1* | 9/2007 | Yasui et al. | 370/250 |
| 2008/0062927 A1* | 3/2008 | Zhu et al. | 370/331 |
| 2008/0075112 A1* | 3/2008 | Hu et al. | 370/466 |
| 2009/0207857 A1* | 8/2009 | Alexander, Jr. | 370/474 |
| 2010/0191841 A1* | 7/2010 | Edelhaus | 709/222 |

OTHER PUBLICATIONS

Intel IXP45X and IXP46X Product Line of Network Processors: Datasheet. Intel, 2006.*

IP2012/IP2022 Wireless Network Processors: Datasheet, UBICOM, 2003.*

Intel IXDP465 Development Platform: User Guide. Intel, 2005.*

Microchip Technology Inc. A Flash Bootloader for PIC16 and PIC18 Devices. Microchip Technology, 2002. Print.*

Microchip Technology Inc. High-Performance ROM-less Microcontrollers with External Memory Bus. Microchip Technology, 2001. Print.*

Finlayson. "Bootstrap Loading Using TFTP." Request for Comments: 906 (1984): 1-5.*

Intel Corp. "Preboot Execution Environment (PXE) Specification." Laptop, Desktop, Server and Embedded Processor Technology—Intel. INTEL Corporation, Sep. 20, 1999.*

Haas, et al.; "Creating advanced functions on network processors: experience and perspectives," Network, IEEE, vol. 17, No. 4, pp. 46-54, Jul.-Aug. 2003.*

Henry Et Al. "Intel Preboot Execution Environment Internet Draft." INTEL Corp., Jun. 1999.*

Wind River Systems Inc. "VxWorks Programmer's Guide V.5.5." 2002.*

* cited by examiner

METHOD AND SYSTEM FOR BOOTING A SOFTWARE PACKAGE ON A NETWORK PROCESSOR

TECHNICAL FIELD

The present invention relates to a network processor device, to methods for booting the network processor, and to systems incorporating the network processor and adapted to boot the processor using the methods.

BACKGROUND

A network processor is a programmable integrated circuit typically provided within a communication system and possessing features making it suitable for dealing with packet data. Applications typically implemented as a software package running on a network processor include:

(i) packet or frame discrimination and forwarding, i.e., the basic operation of a router or switch;

(ii) Quality of Service enforcement—identifying different types or classes of packets and providing preferential treatment for some types or classes of packet at the expense of other types or classes of packet;

(iii) Access Control functions—determining whether a specific packet or stream of packets should be allowed to traverse the piece of network equipment;

(iii) encryption of data streams—built in hardware-based encryption engines allow individual data flows to be encrypted by the processor; and (iv) TCP offload processing.

The following features of a network processor would be advantageous:

a) a small foot print (in order to reduce its manufacturing cost);

b) the ability to be booted with up-to-date data storage devices or interfaces that are not known at present (that is, easy future expendability);

c) the ability to support booting from different data storage devices and interfaces that are widely used on the market (so that a single network processor can be employed in any of multiple applications, making use of these various storage devices and interfaces);

d) the capability for system recovery and on-site programming of the data storage device; and e) for its operating mode to be selectable before start-up.

In conventional solutions, the network processor is provided with an external data storage device in the form of an external non-volatile memory (e.g., parallel NOR Flash), which stores the software package (that is, the software the network processor runs to perform its application). After each power-up, the network processor performs a boot operation in which the network processor runs boot software stored in its internal ROM to load the software package from the external data storage device. This makes it possible to obtain advantages (a), (c) and (e) above to a limited degree, but certainly not features (b) and (d).

In fact, features (a) to (e) are to a certain extent mutually contradictory, so obtaining all of the them is not possible at present within a single system, although some proposals have been made to obtain certain of the advantages at the expense of others.

One possibility is using pin-strapping (that is, selecting for at least a certain time the voltages at one or more pins of the integrated circuit) to control how the integrated circuit boots itself from its data storage device. However, since the pin-strapping is only able to modify the behavior of the network processor to a limited degree, this solution still implies that booting is from a known type of data storage device (e.g., a parallel AMD or Intel flash device).

A second possibility is for the network processor to be designed such that it can be controlled (again by pin-strapping) to boot using a UART (RS232) interface without a non-volatile memory being attached. However, the speed of this interface is much too low for the network processor to be booted this way in each power-up. Typically, the size of the software package to be installed is about 1 MB, which would require a few minutes to boot over the UART interface, whereas most applications require a boot-up taking less than 10 seconds. So, the value of the UART interface is principally that it can be used to transfer the booting software to the network processor in untypical situations, such as the first time that the processor is used or on occasions when the software in the external data storage device has become corrupted. The network processor can then transfer the software to its own external data storage device for use in future boot-ups.

SUMMARY OF THE INVENTION

The present invention aims to provide new and useful methods for booting a network processor with a software package, and network processor systems that perform the methods.

In various embodiments, the present invention proposes in a first aspect that a network processor that incorporates an Ethernet-compatible interface is controllable to load a software package from the Ethernet interface. This makes it possible for software to be transmitted to the network processor in a much shorter time than is possible, for example, over a UART interface.

Note that providing the network processor with the ability to boot over an Ethernet interface is fundamentally different from booting over a UART interface (for example), because typically the size of the code required to support conventional FTP/TFTP communication is much larger: about 10-15 kB. This is too large to provide within the ROM of a network processor, which should more preferably be less than 15 kB, such as 12 kB (and which has other software to store). Including enough ROM code to handle typical Ethernet communication would, therefore, increase the footprint of the network processor very much, and thus greatly increase its cost.

However, the present inventors have realized that it is possible to provide a network processor that can be booted over the Ethernet interface using a much smaller amount of ROM code (and thus with a modest footprint), provided that the data packets used for the booting are in a predetermined format, not for example the full range of data packets that is transmitted in standard Ethernet FTP/TFTP communications.

In particular, in one embodiment of the invention, the data packets carrying the software being booted may be data packets that include labels in regions of the packets that are reserved in standard Ethernet packets. The network processor may be programmed to recognize the packets having this label, and to discard other packets. Thus, the network processor does not have to be programmed to handle the full range of types of Ethernet data packets.

The network processor of the invention will typically be employed as part of a network processor system incorporating a number of other components. In addition to supporting booting over an Ethernet interface, the network processor is preferably adapted to be bootable in one or more (preferable all) of the following ways: using a first external non-volatile data storage device included in the network processor system, such as a flash memory (e.g., parallel NAND or NOR flash, or SPI (serial programming interface) serial flash); or using one or more other interfaces, such as a UART interface. By making the device capable of booting in all of these ways, the user of the device (that is, a designer incorporating the network processor into another product) is given maximum design freedom.

In particular, by providing a method of booting the network processor without using the flash memory of the network processing system (i.e., instead using the UART interface or the Ethernet interface) the embodiments of present invention make it possible, if the software image programmed in the flash is damaged, to bring up the system and re-program the flash. The network processor may be controllable (e.g., by pin-strapping) to upload the software package selectively into its RAM memory and/or into the flash memory of the network processing system.

In a second aspect of the invention, the network processor is provided with a second external non-volatile data storage device, e.g., in the form of an EEPROM memory. The second non-volatile memory provides, in effect, a writable extension of the internal ROM memory of the network processor. For example, this second data storage device may be used to store data for controlling the access of the network processor to a first non-volatile memory storing the software package. The EEPROM memory may not be large enough to store the software package (at least not all of it), but it may store parameters of the first non-volatile memory, and thus make it possible for the network processor to operate with any of a large range of possible sorts of first non-volatile memory. Since, an EEPROM is a writable device, the data it contains can be modified, making it possible for the boot operation to be modified as desired. Note that an EEPROM memory is generally much cheaper than the flash memories typically used as the first non-volatile data storage device of a network processor, so that in many applications the additional cost of providing the EEPROM will be small enough to be commercially acceptable in order to make it possible for the network processor to operate with a wide range of flash memory devices.

In fact, the second non-volatile memory may be useful even if it does not store data for controlling access to the first non-volatile data storage device, since the second non-volatile memory may store other data for controlling the network processor, such as data specifying operating parameters of the network processor.

BRIEF DESCRIPTION OF THE DRAWINGS

An non-limiting embodiment of the invention will now be described, for the sake of example only, with reference to.

DETAILED DESCRIPTION OF ILLUSTRATIVE EMBODIMENTS

Figure 1:
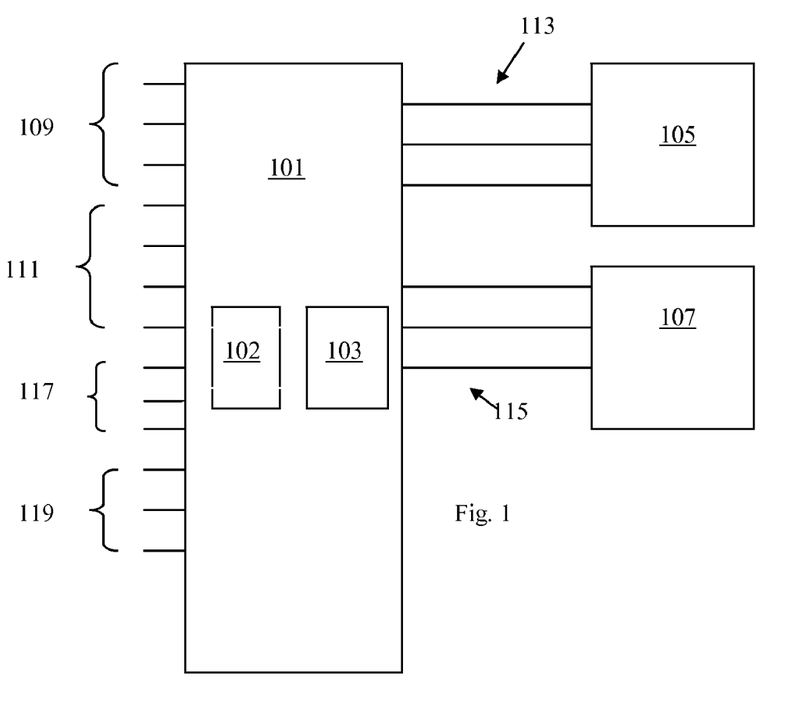
FIG. 1 shows schematically the elements of a network processor system of the present invention.

Referring to FIG. 1, a network processor system, which is an embodiment of the present invention, is illustrated schematically and includes a network processor 101. The network processor 101 includes a ROM memory 102, which stores ROM code by which the boot-up is performed, thereby loading a software package into a RAM memory 103, which is typically an SDRAM. The network processor system further includes at least one first non-volatile data storage device 105, typically in the form of a flash memory.

The system further includes a second non-volatile data storage device 107, typically in the form of an SPI EEPROM. The EEPROM 107 stores an extension of the ROM memory, as discussed below in more detail.

The network processor 101 includes a number of interfaces relating to the boot-up, including two MII interfaces 109, 111 which are suitable for communication respectively with Mil buses, of the kind used for transmitting Ethernet communication. These two interfaces 109, 111 may respectively be an MII interface and a reverse MII-type interface.

The network processor further includes a UART interface 119, as well as interfaces 113, 115 to the first and second data storage devices 105, 107 respectively. Although only a single interface 113 to the first data storage device 105 is shown, more preferably a plurality of interfaces 113 are provided of different type, permitting the network processor 101 to be connected respectively to different kinds of first data storage device 105, such as parallel NAND and NOR flash or alternatively SPI serial flash.

The network processor further includes one or more pins (inputs) 117 used to pin-strapping the network processor to control the boot-up process. In FIG. 1 three such pins are shown. These pins are referred to in the following discussion as "pin 0", "pin 1" and "pin 2". The voltages at the pins 117 are typically determined during power-up by pull-up or pull-down registers on the circuit board (not shown). Their values are locked by internal registers.

Additionally, the network processor typically may include one or more other interfaces (not shown) of a conventional kind permitting it to perform its functions, such as interfaces to buses within the complete communication system within which the network processor system is located.

Note that in certain applications of the network processor 101, one or more of the interfaces 109, 111, 119 may not in fact be in use. For example, the network processor 101 may be used inside a communication system that is not intended to be connected to an outside device using a UART connection, and in this case the interface 119 is not used.

Figure 2:
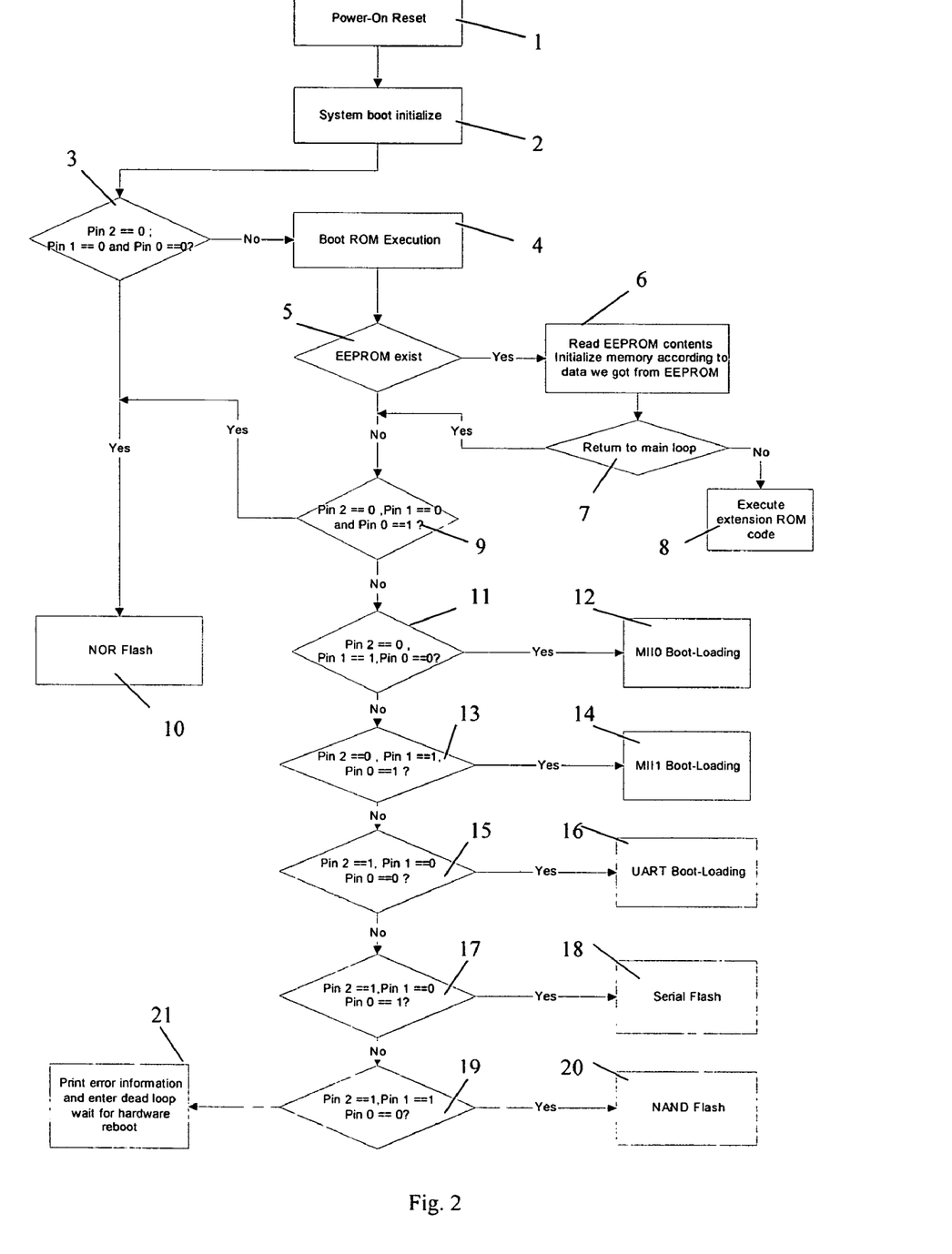
FIG. 2 is a flow diagram illustrating an overall booting operation performed by the embodiment of FIG. 1.

Turning to FIG. 2, a flow diagram of the boot-up process is shown. This process commences with the power-up of the network processor system (step 1), which triggers an initialization of the boot process (step 2) in which the network processor 101 registers the inputs to the pins 117.

In step 3, the network processor 101 determines whether the inputs to pins 117 are all low. If so, the network processor boots directly from the flash memory 105 according to the code stored in the ROM 2 (step 10) assuming that the flash memory 105 is a NOR flash, and without accessing the EEPROM 107 (i.e., the network processor uses default values for the booting, contained in its ROM memory 102). This boot mode could be used when the user wants to bypass the execution of the boot ROM codes in the EEPROM 107 and run only the codes residing in the flash device 105.

Otherwise, the network processor 101 determines (step 4) that it has been instructed to access the EEPROM memory 107, to obtain the extension to the ROM code. In step 5, the network processor 101 verifies that an EEPROM memory 107 has, in fact, been provided within the network processor system.

Note that initially the network processor 101 may not know in advance the size of the EEPROM 107 (if any). This is preferable, since programming the size of the EEPROM 107 into the ROM 102 would prevent the network processor 101 from being used in conjunction with EEPROMs 107 of different sizes. Therefore, initially the network processor 101 will assume that the EEPROM 107 is of small size (one byte length field). If the first two bytes the network processor 101 receives from the EEPROM are 0xaa55, then the assumption is correct. Otherwise, it will try a bigger size (two bytes length field). If the first two bytes it receives are 0xaa55, then there is a big size EEPROM linked to the network processor 101 by an SPI interface. Otherwise no EEPROM exists.

Assuming that the result of the determination in step 5 is positive, the method passes to step 6 in which the network processor 101 reads data from the EEPROM 107, which then influences how the rest of the boot operation is carried out.

In step 7 the network processor 101 determines whether the data it received from the EEPROM 107 included an instruction to the network processor 101 to complete the booting operation under the control of command instructions stored within the EEPROM 107 (see discussion below). If so, the network processor 101 completes the boot operation by interaction with the EEPROM 107 (step 8). Alternatively, the method returns to the main loop.

In step 9, the network processor determines whether the pins 117 are now in a different state, in which for example pins 1 and 2 are low but pin 0 is high. If the result is positive, the system passes to step 10, in which it boots from the flash device 105 assuming that the flash device 105 is a NOR flash. Note that in this case (in contrast to the possibility explained above that the network processor passes directly from step 3 to step 10) the network processor 101 can use parameters of the flash memory 105 obtained from the EEPROM 107. Thus, the EEPROM 107 makes it possible for the network processor 101 to be operated in combination with a wide range of possible flash devices, and indeed for the type of flash device to be changed provided that the data in the EEPROM 107 is changed accordingly.

Alternatively, if the determination in step 9 is negative, the network processor 101 passes through a succession of steps 11, 13, 15, 17, 19 in each of which it checks whether the voltages at the pins are indicating that booting should be performed by obtaining the software package from another source. Specifically, in step 11 the network processor determines whether pin 1 is high and the other two pins are low, and if so boots using the MII interface 109 (step 12). In step 13 the network processor determines whether pins 1 and 0 are high and pin 2 is low, and if so boots using the reverse MII interface 11 (step 14). In step 15 the network processor determines whether pin 2 is high and the other two pins are low, and if so boots using the UART interface 119 (step 16). In step 17 the network processor determines whether pins 0 and 2 are high and pin 1 is low, and if so boots using the flash device 105, assuming that the device 105 is a serial flash (step 18). Initially, the first thing the network processor 101 will check is the size of serial flash, and it will assume a big size first (one requiring four address bytes). If the first byte it gets is an even number, the assumption is correct; otherwise, the serial flash can be accessed using only three address bytes. In step 19 the network processor determines whether pins 1 and 2 are high and pin 0 is low, and if so boots using the flash device 105, assuming that the device 105 is a NAND flash (step 20).

If none of steps 9, 11, 13, 15, 17 or 19 determines that the measured voltages on the pins 17 match the respective set of expected values (i.e., if the determinations in steps 9, 11, 13, 15, 17 and 19 are all negative) the network processor 101 generates an error message (step 21) and transmits it out of the UART interface (an error message may then be displayed on a screen). The network processor 101 then enters a dead loop in which it waits for a hardware reboot.

One advantage of the possibility of uploading the software package using the UART interface 119 or one of the Ethernet interfaces 109, 111 is that it makes it possible to modify the data stored in the flash memory 105. This is valuable, for example, in the case that the data in the flash memory 105 becomes corrupted and needs to be refreshed. Additionally, it is valuable in the case that the network processor system has to be upgraded. Note that this operation can be performed without the use of an EJTAG debugger (that is, a conventional tool connected temporarily to the communication system by a user, by which the user can manually modify the data stored in a flash memory of the communication system, e.g., to address incompatibilities between the data in the flash and the components of the system). The use of an EJTAG debugger is time-consuming and requires a high level of knowledge from the user. Nor is the tool cheap. Additionally, booting using one of the Ethernet interfaces 109, 111 is fast enough that it can, if desired, be performed during every boot-up procedure, making the presence of the flash memory 105 optional.

Figure 3:
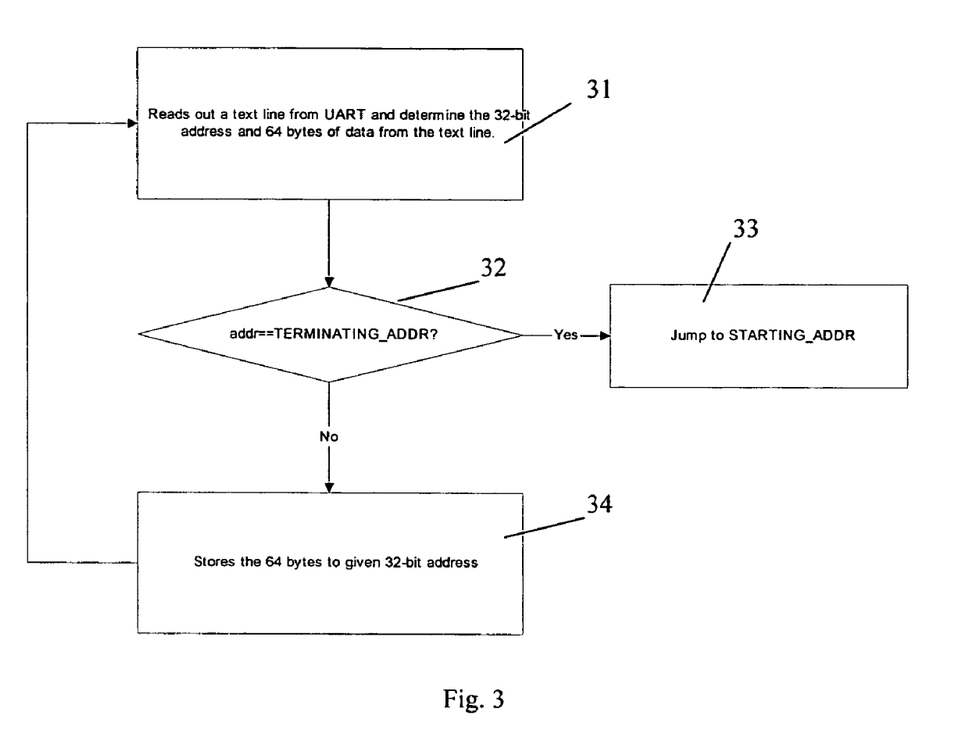
FIG. 3 is a flow diagram illustrating the UART booting process of FIG. 2.

Turning to FIG. 3, the steps of booting using the UART interface 119 (i.e., the sub-steps of step 16 in FIG. 2) are listed. The network processor is set to communicate using 115200bps, 8-N-1. The network processor continually polls for the software package (referred to here as bin.txt) to be sent to it over the UART interface 119. In step 31, the network processor reads a text line of bin.txt, and extracts from the line 32 bits of address data, and 64 bytes of other data. In step 32 it checks whether the address is a predetermined terminating address. If so, then the network processor 101 jumps to (i.e., the program counter is set to) the starting address specified in bin.txt, and the network processor 101 starts to operate the software package (step 33). Otherwise, in step 34 it transfers the data portion of the line into the SDRAM 103 then returns to step 31. Subsequently, there may be an operation in which the software package is copied into the flash 105, with parameters of the flash being received over the UART interface.

We now turn to a discussion of the presently preferred format of the bin.txt. bin.txt is produced by converting a conventional S-Record (S3) file into a simplified format using a PC-based Perl script (sikadown.pl). The representation scheme within bin.txt is preferably such that two ASCII bytes represent the hexadecimal value of a byte. For example, "A5" represents actual byte value of 0xA5. Each line of bin.txt is 136 text characters long, with the first 8 text bytes characters representing the 32-bit address and the rest of the text bytes representing the 64 bytes of program to be loaded. Eight's and nine's are used to indicate the end of this file. The terminating address is "99999999", and is an un-aligned 32-bit address. Note that conventional compiler tools that generate S-Record do not give any un-aligned 32-bit addresses. Unfilled spaces are padded with 'F's to form 136-character text line. Table 1 shows the frame formats of four possible lines of bin.txt.

TABLE 1

| 4 bytes | 64 bytes | |
|---|---|---|
| Address | Data | |
| Address | Data | FFFF . . . FFFF |
| 11111111 | CHECKSUM | XXXX . . . XXXX |
| 99999999 | STARTING_ADDR | XXXX.XXX |

Figure 4:
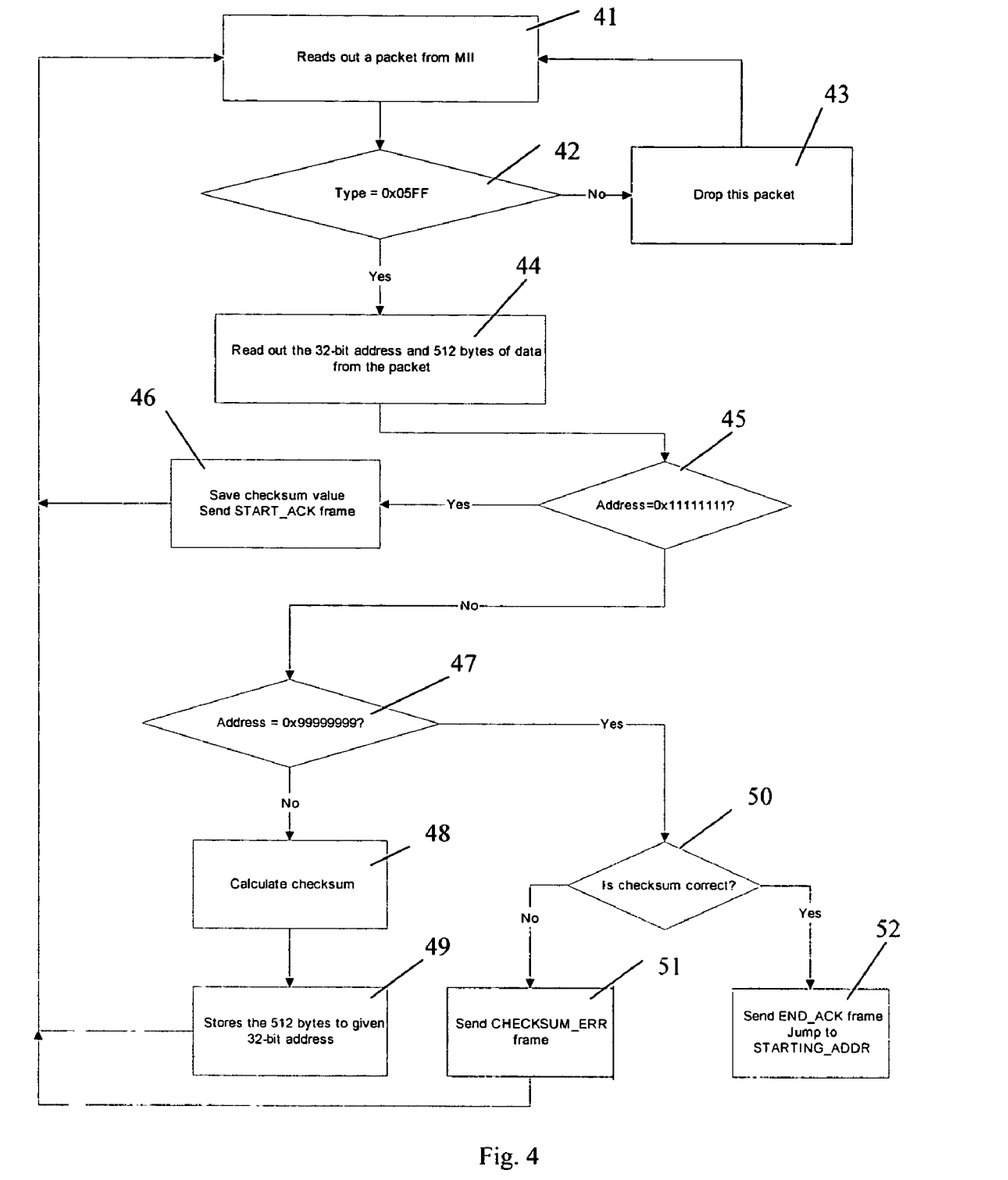
FIG. 4 is a flow diagram illustrating an Ethernet booting process of FIG. 2.

We now turn to a discussion, with reference to FIG. 4, of how booting is performed using one of the Ethernet-compatible MII interfaces 109, 111 (i.e., what is performed in each of steps 12 and 14 of FIG. 2). This boot mode may be used when the user wants to execute the initialization codes within the boot ROM before boot-loading further codes from an MII interface. This mode may also be used if the network processor system is integrated with another chipset to build a high-end system solution without its own FLASH. It may also be used to do on-board FLASH programming when the content of the flash memory 105 is damaged.

When the booting operation of step 12 or 14 starts, the Ethernet port and DMA are configured. The network processor 1 continuously polls using the respective interface connected to the respective MII bus, for bin.txt to be sent from a host (such as a PC having a master chip). The host should segment the bin file into continuous Ethernet frames, in the special format discussed below. In step 41 a packet is received from the respective MII bus. The embodiment is arranged such that this packet is a non-standard Ethernet packet, containing a symbol that indicates this fact to the network processor to differentiate it from a normal Ethernet frame. Specifically, the type field value of the Ethernet frame used for booting is set to 0x05FF. This is neither a conventional type nor a length value, since a typical type value would be greater than or equal to 0x600, and a typical length value would be less than or equal to 1506 (0x5E2). Tables 2 to 5 show the formats of certain kinds of booting Ethernet frame used in the embodiment, and these will be discussed in detail below, but they all share the special type field value, namely 0x05FF. Accordingly, following step 41 the network processor checks whether the received packet is in this form (step 42). If not, it drops (i.e., deletes) the packet (step 43). If so, it passes to step 44 in which it extracts 32 bits of address data and 512 bytes of other data from the packet.

Table 2 shows the format of four types of frames sent from the external host device to the network processor 101, while Table 3 shows the format of three types of Ethernet frames transmitted by the network processor 101 to the external host.

sends a START_ACK frame (as shown in Table 3) out through the MII interface (step 46).

The second two frames shown in Table 2 are data frames, including a section of data that is part of the software package. The lower of these two types of frames includes padding.

The fourth frame shown in Table 2 is an end frame. This too contains a predetermined address (in this case 0x99999999). In step 47, the network processor 101 tests the received frame for this address. This type of frame also includes a field called STARTING_ADDR, which stores a starting address.

If the determination in step 47 is negative, then the frame is in one of the two data frame formats of Table 2. Its checksum is calculated (step 48), and in step 49 the 512 bytes of data in the frame are stored in the address specified within the data frame.

Conversely, if in step 47 the address 0x99999999 was found in the received packet, then the method checks the checksum (step 50). If this is correct, then the network processor 101 transmits an END_ACK frame (in the format shown in Table 3) to the host, and sets its program counter to the STARTING_ADDR specified in "bin.txt" (step 52). It is now ready to run the software package. However, if the checksum is found to be incorrect in step 50, the network processor 101 transmits to the host (step 51) a CHECKSUM_ERR frame (in the format of Table 3).

All the fields labeled "Address" in Table 2 are 32-bit address aligned. The checksum fields are 32-bit counters, and are calculated based on data lines in bin.txt only (not including the lines starting with 0x11111111 or 0x99999999). The master chip of the host will keep sending the start frame until it receives start_ack frame from the network processor 101. After that, it continuously sends data frames. Finally, once all the data has been transmitted, it sends the end frame and waits for the acknowledgement. If it receives the end_ack frame, it

TABLE 2

Start frame:

| 6 bytes | 6 bytes | 2 bytes | 4 bytes | | 4 bytes | 4 bytes |
|---|---|---|---|---|---|---|
| DA | SA | 0x05FF | 0x11111111 | CHECKSUM | XXXX | CRC |

Data frame 0:

| 6 bytes | 6 bytes | 2 bytes | 4 bytes | 512 bytes | 4 bytes |
|---|---|---|---|---|---|
| DA | SA | 0x05FF | Address | DATA | CRC |

Data frame1:

| 6 bytes | 6 bytes | 2 bytes | 4 bytes | | | 4 bytes |
|---|---|---|---|---|---|---|
| DA | SA | 0x05FF | Address | DATA | PAD | CRC |

End frame:

| 6 bytes | 6 bytes | 2 bytes | 4 bytes | | | 4 bytes |
|---|---|---|---|---|---|---|
| DA | SA | 0x05FF | 0x99999999 | STARTING_ADDR | XXXX | CRC |

The top frame of Table 2 is a start frame used as part of a handshake process, and contains a predefined address (in this case 0x11111111). In step 45 of the method, the network processor tests whether this received packet contains this special address, and if so it saves the checksum value and will return to main loop. Conversely, if it receives checksum_err or does not receive end_ack within some predetermined time, it will retransmit the software. The above procedure makes it possible to protect data integrity and synchronize the operation of both sides.

TABLE 3

Start_ack frame:

| 6 | 6 | 2 | 4 | 42 | 4 |
|---|---|---|---|---|---|
| DA | SA | 0x05FF | 0x11111111 | PAD | CRC |

Checksum err:

| 6 | 6 | 2 | 4 | 42 | 4 |
|---|---|---|---|---|---|
| DA | SA | 0x05FF | 0x77777777 | PAD | CRC |

End_ack frame:

| 6 | 6 | 2 | 4 | 42 | 4 |
|---|---|---|---|---|---|
| DA | SA | 0x05FF | 0x99999999 | PAD | CRC |

The "start_ack frame" informs the host that "start frame" is received and the network processor 101 is ready to receive software frames. The "end_ack frame" informs the host that software downloading was completed successfully. The "checksum err frame" informs the host that the software download failed, and requests that the host tries again.

The embodiment also employs other types of Ethernet frames that allow the host to control the network processor 101 after the software package is loaded. The format of these frames transmitted from the host to the network processor 101 is shown in Table 4, while the format of these frames transmitted from the network processor 101 to the host is shown in Table 5.

Frame from Counterpart Device

TABLE 4

| 6 | 6 | 2 | 1 | 1 | 4 |
|---|---|---|---|---|---|
| DA | SA | 0x05FE | Read/write | Command | DATA | CRC |

The "read/write" field takes the value 0 to instruct a read command, and the value 1 to instruct a write command. The user-defined Command field contains a command.

TABLE 5

| 6 | 6 | 2 | | 4 |
|---|---|---|---|---|
| DA | SA | 0x05FE | DATA | CRC |

We now turn to a discussion, with reference to Table 7, of the format of the content layout of the flash memory 105 in the case that it is a serial flash device.

TABLE 6

| 00000000 | Target SDRAM address |
|---|---|
| 00000004 | Program size(32bit unit) |
| 00000008 | Program Payload onwards |
| ... | |
| ... | |
| ... | |

As indicated in Table 6, the address 00000000 in the serial flash memory contains the address of the target SDRAM 3 in the network processor 101. The address 00000004 contains the size of the software package, which is a 32-bit value. Some or all of the rest of the flash memory addresses store the software package itself.

We now turn to a discussion, with reference to Table 6, of a preferred structure for the data stored in the EEPROM 107.

TABLE 7

| OFFSET | CONTENT | | |
|---|---|---|---|
| 0 | PHY1 | PHY0 | AA55 |
| 4 | MAC3 | MAC2 | MAC1 MAC0 |
| 8 | OFFSET | VALID | MAC5 MAC4 |
| | Reserved area | | |
| | Reserved area | | |
| OFFSET | Address(30'bx & 2'b00) | | |
| OFFSET + 4 | Data | | |
| | Address(30'bx & 2'b01) | | |
| | Length0 | | |
| | Data0 | | |
| | Data1 | | |
| | ... | | |
| | ... | | |
| | ... | | |
| | Address(30'bx & 2'b11) | | |
| | Address(option) | | |

The first 2 bytes of the EEPROM memory store a signature. The following two bytes respectively store a PHY0 and a PHY1 address. The next 6 bytes store system MAC addresses. The next byte is a VALID flag. If the VALID flag=0, the MAC address is valid. The next byte stores an offset value that points to the beginning of address/data field. The following section of the EEPROM memory is a reserved area.

Table 7 also shows that the EEPROM memory 107 may include any one of more of three types of command statements (effectively, subroutines for the network processor 101 to perform when accessing the EEPROM). These three types of statements are distinguished by the three respective types of addresses used at their beginning.

In the first type, the lowest two bits of the address are equal to 2'b00. This indicates only that the data that follows should be written to this address.

In the second type, the lowest two bits of the address are equal to 2'b01. This means that the address field is followed by a length field, followed by data of this length. In response to this command the network processor 101 should continuously write this length of data from the location directly following the length field to a location specified by the address. However, since the last two bits of the address are for type selection only, they are masked.

In the third type, the lowest 2 bit of the address are equal to 2'b11. This is followed by a further address, which can take one of two options. Specifically, if the further address is equal to 0x3, this means the end of address/data field, and that the network processor should return to the main loop. Alternatively, if the further address equals 0xFFFFFFFF, this means the end of address/data field, and that the network processor should jump to the address directly following.

By usage of these three types of command in the EEPROM 107, it is possible to initialize the chip registers in the network processor 101. It is also possible to load the software package from the EEPROM 107. Furthermore, the reserved area of the EEPROM 107 can be used to store boot up parameters.

What is claimed is:

1. A network processor for performing a communication procedure by running a software package, the processor including:
    a plurality of data interfaces, wherein one of the plurality of interfaces comprises a first Ethernet interface; and
    at least one input pin coupled to the processor, the at least one input pin configured to receive a first command,
    wherein:
    the processor receives a data packet using the first Ethernet interface upon receiving the first command, the processor determines whether the data packet includes a predetermined label within a type field of a non-standard Ethernet packet, wherein the predetermined label differentiates the data packet from a normal Ethernet packet and indicates to the processor that the data packet having the predetermined label set in the type field is used for booting, the processor stores the data packet if the data packet includes the predetermined label within the type field of the non-standard Ethernet packet, the processor drops the data packet if the data packet does not include the predetermined label within the type field of the non-standard Ethernet packet, the processor assembles at least one stored data packet to form the software package, and the processor boots the software package.

2. The processor according to claim 1, wherein the plurality of data interfaces further includes a second Ethernet interface.

3. The processor according to claim 1, wherein the plurality of data interfaces further includes a UART interface.

4. The processor according to claim 1, wherein the processor further communicates with a first non-volatile data storage device storing the software package and with a second non-volatile data storage device storing control data, the processor obtains the control data from the second non-volatile data storage device and the processor uses the control data to boot the software package from the first non-volatile data storage device.

5. The processor of claim 1, wherein the processor comprises a network processor.

6. The processor of claim 1, wherein the Ethernet packet comprises a start frame, the start frame comprising a first unique address.

7. The processor of claim 1, wherein the Ethernet packet comprises a first data frame, the first data frame comprising a fixed data portion.

8. The processor of claim 7, wherein the first data frame comprises boot software.

9. The processor of claim 1, wherein Ethernet packet comprises a second data frame, the second data frame comprising a data portion and a padding portion.

10. The processor of claim 1, wherein Ethernet packet comprises an end frame, the end frame comprising a second unique address.

11. The processor according to claim 1, wherein
the software package comprises network processor booting software; and
the processor boots using the network processor booting software.

12. The processor according to claim 11, wherein the processor boots using the network processor booting software at start-up.

13. The processor of claim 1, wherein the predetermined label comprises a value within a range of 0x05E3 to 0x05FF.

14. The processor of claim 1, wherein the predetermined label comprises a value of 0x05FF.

15. A network processor system comprising:
a processor comprising
a plurality of data interfaces, wherein one of the plurality of interfaces comprises a first Ethernet interface, and
at least one input pin coupled to the processor, the at least one input pin configured to receive a first command, wherein:
the processor receives a data packet using the first Ethernet interface upon receiving the first command,
the processor determines whether the data packet includes a predetermined label within a type field of a non-standard Ethernet packet, wherein the predetermined label differentiates the data packet from a normal Ethernet packet and indicates to the processor that the data packet having the predetermined label set in the type field is used for booting,
the processor stores the data packet if the data packet includes the predetermined label within the type field of the non-standard Ethernet packet,
the processor drops the data packet if the data packet does not include the predetermined label within the type field of the non-standard Ethernet packet,
the processor assembles at least one stored data packet to form a software package, and
the processor boots the software package; and
a first non-volatile memory device for storing the software package, wherein the processor system stores the software package received using the first Ethernet interface into the first non-volatile memory.

16. The processor system according to claim 15, further including a second non-volatile memory device for storing control data, wherein the processor obtains the control data from the second non-volatile memory device and use the control data to boot the software package from the first non-volatile memory.

17. The processor system of claim 15, wherein the predetermined label comprises a value within a range of 0x05E3 to 0x05FF.

18. The processor system of claim 15, wherein the predetermined label comprises a value of 0x05FF.

19. A network processor system comprising:
a processor for performing a communication procedure by running a software package, the processor including at least one input pin coupled to the processor, the at least one input pin configured to receive a first command;
a data interface receiving the software package via data packets, each data packet comprising a predetermined label having a non-standard value within a standard field of the data packet within a type field of a non-standard Ethernet packet, wherein the predetermined label differentiates a data packet from a normal Ethernet packet and indicates to the processor that the data packet having the predetermined label set in the type field is used for booting, and wherein the data interface drops packets that do not have the non-standard value within the standard field the predetermined label within the type field of the non-standard Ethernet packet;
a first non-volatile memory in communication with the processor for storing the software package, wherein the software package is stored in response to detecting the predetermined label having a non-standard value within a standard field of the within a type field of an non-standard Ethernet packet data packet; and
a second non-volatile memory in communication with the processor for storing control data for controlling the processor;
wherein the processor obtains the control data from the second non-volatile memory and, based on the control data, boots the software package from the first non-volatile memory upon receiving the first command.

20. The processor system according to claim 19, wherein the standard field comprises a type field, and the non-standard value comprises a value outside of a normal frame of a packet.

21. The processor system of claim 19, wherein the predetermined label comprises a value within a range of 0x05E3 to 0x05FF.

22. The processor system of claim 19, wherein the predetermined label comprises a value of 0x05FF.

23. A network processor system comprising:
a processor for performing a communication procedure by running a software package, the processor including at least one input pin coupled to the processor, the at least one input pin configured to receive a first command;
a data interface configured to receive the software package via non-standard data Ethernet packets, each non-standard data Ethernet packet comprising a predetermined label within a type field of the non-standard Ethernet data packet, wherein the software package is stored in response to detecting the predetermined label in the non-standard Ethernet data packets, wherein the predetermined label set in the type field differentiates the data packet from a normal Ethernet packet and indicates to the processor that the data packet having the predetermined label set in the type field is used for booting, and wherein the data interface drops data packets that do not have the predetermined label; and
an EEPROM memory in communication with the processor for storing control data for controlling the processor;
wherein the processor obtains the control data from the EEPROM memory and, based on the control data, boots the processor system with the software package, upon receiving the first command.

24. The processor system according to claim 23, wherein the EEPROM is arranged to store at least one command instruction, the processor being arranged to read the command instruction and perform an operation specified by the command instruction.

25. The processor system of claim 23, wherein the predetermined label comprises a value within a range of 0x05E3 to 0x05FF.

26. The processor system of claim 23, wherein the predetermined label comprises a value of 0x05FF.

27. A method of operating a network processor, the method comprising:
providing a processor that includes an Ethernet interface and at least one additional pin;
receiving a command at the at least one additional pin;
in response to the command, receiving a software package through the Ethernet interface via data packets having a predetermined label in a standard field, wherein the standard field comprises a type field within a type field of a non-standard Ethernet packet, and the predetermined label differentiates the data packet from a normal Ethernet packet and indicates to the processor that the data packet having the predetermined label set in the type field is used for booting;
the processor assembling the data packets to form the software package, and storing the software package in response to detecting the predetermined label in the standard field of the data packets within a type field of a non-standard Ethernet packet;
the processor dropping data packets if the predetermined label is not detected in the standard field of the data packets within the type field of the non-standard Ethernet packet; and
performing a communication procedure by booting the software package.

28. The method according to claim 27, further comprising, upon receiving a data packet using the Ethernet interface, determining whether the data packet includes the predetermined label, and discarding the data packet if the data packet does not include the predetermined label.

29. The method according to claim 27, wherein receiving the software package comprises receiving the software package from a first non-volatile data storage device and wherein receiving the command comprises receiving the command from a second non-volatile data storage.

30. The method according to claim 29, wherein receiving the command includes receiving control data, the processor using the control data to boot the software package from the first non-volatile data storage device.

31. The method according to claim 29, wherein the second non-volatile data storage comprises an EEPROM.

32. The method according to claim 27, wherein receiving the command includes receiving control data, the processor using the control data to run the software package.

33. The method according to claim 27, wherein performing a communication procedure comprises booting the processor by running the software package.

34. The method according to claim 27, wherein receiving a command at the at least one additional pin comprises receiving a command from an interface that consists of three pins.

35. The method according to claim 27, wherein one of the non-standard Ethernet data packets comprise a start frame, the start frame comprising a first unique address.

36. The method according to claim 27, wherein at least one non-standard Ethernet data packet comprises a first data frame, the first data frame comprising boot software.

37. The method of claim 27, wherein the predetermined label comprises a value within a range of 0x05E3 to 0x05FF.

38. The method of claim 27, wherein the predetermined label comprises a value of 0x05FF.

* * * * *

UNITED STATES PATENT AND TRADEMARK OFFICE
CERTIFICATE OF CORRECTION

PATENT NO. : 8,260,968 B2
APPLICATION NO. : 11/337827
DATED : September 4, 2012
INVENTOR(S) : Xu et al.

It is certified that error appears in the above-identified patent and that said Letters Patent is hereby corrected as shown below:

In the Claims:

In Col. 14, lines 15-16, claim 28, delete ", and discarding the data packet if the data packet does not include the predetermined label".

Signed and Sealed this
Third Day of September, 2013

Teresa Stanek Rea
*Acting Director of the United States Patent and Trademark Office*